United States Patent
Nakanishi et al.

(10) Patent No.: US 12,275,391 B2
(45) Date of Patent: Apr. 15, 2025

(54) CONTROL APPARATUS FOR VEHICLE

(71) Applicant: TOYOTA JIDOSHA KABUSHIKI KAISHA, Aichi-ken (JP)

(72) Inventors: Naoki Nakanishi, Nagoya (JP); Masato Yoshikawa, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 309 days.

(21) Appl. No.: 18/159,092

(22) Filed: Jan. 25, 2023

(65) Prior Publication Data
US 2023/0242089 A1    Aug. 3, 2023

(30) Foreign Application Priority Data
Jan. 28, 2022   (JP) ................. 2022-012308

(51) Int. Cl.
| | | |
|---|---|---|
| B60W 20/10 | (2016.01) | |
| B60W 10/02 | (2006.01) | |
| B60W 10/04 | (2006.01) | |
| B60W 20/40 | (2016.01) | |
| B60W 50/10 | (2012.01) | |

(52) U.S. Cl.
CPC ........... *B60W 20/10* (2013.01); *B60W 10/02* (2013.01); *B60W 10/04* (2013.01); *B60W 20/40* (2013.01); *B60W 50/10* (2013.01)

(58) Field of Classification Search
CPC ...... B60W 10/02; B60W 10/04; B60W 10/06; B60W 10/08; B60W 20/10; B60W 20/40; B60W 30/192; B60W 30/20; B60W 50/10
See application file for complete search history.

(56) References Cited

U.S. PATENT DOCUMENTS

| | | | |
|---|---|---|---|
| 2002/0170758 A1* | 11/2002 | Shimabukuro | B60W 10/08 903/918 |
| 2014/0018207 A1* | 1/2014 | Kobayashi | B60K 6/48 903/902 |
| 2014/0221152 A1* | 8/2014 | Tsutsumi | B60W 20/40 180/65.265 |
| 2015/0367842 A1 | 12/2015 | Nakanishi et al. | |
| 2018/0201253 A1* | 7/2018 | Fujita | B60K 6/445 |

FOREIGN PATENT DOCUMENTS

WO    2014097376 A1   6/2014

* cited by examiner

*Primary Examiner* — Edwin A Young
(74) *Attorney, Agent, or Firm* — HAUPTMAN HAM, LLP

(57) ABSTRACT

A control apparatus for a vehicle that includes an engine, an electric motor and a clutch provided between the engine and the electric motor. An engine-start delay control is executed in a case in which a requested drive amount is realized by only a torque of the electric motor and a first starting manner is being selected as an engine starting manner. Then, in a case in which a predetermined time elapses from initiation of the engine-start delay control, the engine-start delay control is terminated and the engine is started in the first starting manner. On the other hand, in a case in which the engine starting manner is switched from the first starting manner to a second starting manner before the predetermined time elapses from the initiation of the engine-start delay control, the engine-start delay control is terminated and the engine is started in the second starting manner.

6 Claims, 5 Drawing Sheets

CONTROL APPARATUS FOR VEHICLE

This application claims priority from Japanese Patent Application No. 2022-012308 filed on Jan. 28, 2022, the disclosure of which is herein incorporated by reference in its entirety.

FIELD OF THE INVENTION

The present invention relates to a control apparatus for a vehicle that includes an engine, an electric motor and a clutch provided between the engine and the electric motor.

BACKGROUND OF THE INVENTION

There is well known a control apparatus for a vehicle that includes (i) an engine, (ii) drive wheels, (iii) an electric motor connected to a power transmission path between the engine and the drive wheels in a power transmittable manner and (iv) a clutch provided between the engine and the electric motor in the power transmission path. For example, WO/2014/097376 discloses such a control apparatus. This International Patent Application Publication teaches an engine start control in which, after the engine is started by ignition of the engine, a rotational speed of the engine is increased, by self-rotation of the engine, toward synchronization of the clutch, with the clutch being in its released state or slipping state, wherein a mode of the engine start control is changed depending on whether an engine start request is made by a vehicle driver's operation such as accelerator operation or made by means other than the vehicle driver's operation.

SUMMARY OF THE INVENTION

By the way, in an engine starting manner in which the engine is initially exploded in an early stage, a rate of increase of the rotational speed is high, so that the clutch is engaged early, for example, when a rotational speed of the electric motor is low. The early engagement of the clutch is likely to cause a start shock. In a region in which the start shock is likely to be caused, it might be possible to employ another engine starting manner in which the engine is initially exploded after completion of the synchronization of the clutch which is achieved by increase of the rotational speed of the engine made by cranking torque without fuel supply to the engine. However, as compared with in the above-described engine starting manner in which the engine is initially exploded in an early stage, it is inferior in acceleration responsiveness in this engine starting manner in which the engine is initially exploded after the completion of the synchronization of the clutch. Therefore, there is room for improvement in terms of both suppressing the start shock and improving the acceleration responsiveness.

The present invention was made in view of the background art described above. It is therefore an object of the present invention to provide a vehicle control apparatus capable of both suppressing the start shock and improving the acceleration responsiveness when the engine is started.

The object indicated above is achieved according to the following aspects of the present invention.

According to a first aspect of the invention, there is provided a control apparatus for a vehicle that includes (i) an engine, (ii) drive wheels, (iii) an electric motor connected to a power transmission path between the engine and the drive wheels in a power transmittable manner and (iv) a clutch provided between the engine and the electric motor in the power transmission path. The control apparatus includes an engine-start control portion is configured, when the engine is to be started, to control the clutch such that a cranking torque required by cranking for increasing a rotational speed of the engine is transmitted through the clutch and such that a synchronization between input and output rotational speeds of the clutch is completed. The engine-start control portion is configured, in conjunction with the cranking, to control the electric motor such that the cranking torque is outputted by the electric motor, and to control the engine such that operation of the engine is initiated. The engine-start control portion is configured to start the engine in an engine starting manner that is a selected one of first and second starting manners, such that the rotational speed of the engine is increased by the cranking torque and then the engine is exploded after completion of the synchronization in the first starting manner, and such that the engine is exploded in process to the completion of the synchronization and then the rotational speed of the engine is increased by at least a torque of the engine after explosion of the engine in the second starting manner. The engine-start control portion is configured to execute an engine-start delay control for delaying start of the engine, in a case in which, when the start of the engine is requested, a requested drive amount requested to the vehicle is realized by only a torque of the electric motor and the first starting manner is being selected as the engine starting manner for starting the engine. Then, in a case in which a predetermined time elapses from initiation of the engine-start delay control, the engine-start control portion is configured to terminate the engine-start delay control and to start the engine in the first starting manner. On the other hand, in a case in which the engine starting manner is switched from the first starting manner to the second starting manner before the predetermined time elapses from initiation of the engine-start delay control, the engine-start control portion is configured to terminate the engine-start delay control and to start the engine in the second starting manner. For example, the control apparatus further includes a power-source control portion and a clutch control portion, wherein the engine-start control portion is configured, when the engine is to be started, to output, to the clutch control portion, a command requesting the cranking torque to be transmitted through the clutch and requesting the synchronization between the input and output rotational speeds of the clutch to be completed, and wherein the engine-start control portion is configured, when the engine is to be started, to output, to the power-source control portion, a command requesting the cranking torque to be outputted by the electric motor in conjunction with the cranking, and a command requesting the operation of the engine to be initiated in conjunction with the cranking.

According to a second aspect of the invention, in the control apparatus according to the first aspect of the invention, the engine-start control portion is configured to select the first starting manner in a case in which a rotational speed of the electric motor is lower than a lower-limit speed value that is minimally required to determine that a start shock caused upon the start of the engine in the second starting manner is tolerable, wherein the engine-start control portion is configured to select the second starting manner in a case in which the rotational speed of the electric motor is not lower than the lower-limit speed value.

According to a third aspect of the invention, in the control apparatus according to the first or second aspect of the invention, the engine-start control portion is configured to allow execution of the engine-start delay control, when determining that the start of the engine in the second starting manner is ready to be executed.

According to a fourth aspect of the invention, in the control apparatus according to any one of the first through third aspects of the invention, in a case in which, when the start of the engine is requested, the requested drive amount requested to the vehicle is not realized by only the torque of the electric motor, the engine-start control portion is configured to not execute the engine-start delay control or terminate the engine-start delay control, and to select one of the first and second starting manners as the engine starting manner, so as to start the engine in the selected one of the first and second starting manners.

According to a fifth aspect of the invention, in the control apparatus according to any one of the first through fourth aspects of the invention, the engine-start control portion is configured to select one of the first and second starting manners as the engine starting manner, depending on a rotational speed of the electric motor and a transmission shaft torque applied to a transmission shaft to which the electric motor is connected in a power transmittable manner in the power transmission path and to which the engine is connected through the clutch in a power transmittable manner in the power transmission path.

In the control apparatus according to the first aspect of the invention, the engine is started in an engine starting manner that is a selected one of the first and second starting manners, such that the rotational speed of the engine is increased by the cranking torque and then the engine is exploded after completion of the synchronization in the first starting manner, and such that the engine is exploded in process to the completion of the synchronization and then the rotational speed of the engine is increased by at least the torque of the engine after explosion of the engine in the second starting manner. The engine-start delay control is executed in the case in which, when the start of the engine is requested, the requested drive amount is realized by only the torque of the electric motor and the first starting manner is being selected as the engine starting manner for starting the engine. Then, in the case in which the predetermined time elapses from initiation of the engine-start delay control, the engine-start delay control is terminated and the engine is started in the first starting manner. On the other hand, in the case in which the engine starting manner is switched from the first starting manner to the second starting manner before the predetermined time elapses from initiation of the engine-start delay control, the engine-start delay control is terminated and the engine is started in the second starting manner. Thus, when the second starting manner cannot be selected as the engine starting manner, the start of the engine is waited for the predetermined time. Then, while the engine start is being waited, if the second starting manner becomes selectable, the engine starting manner is switched from the first starting manner to the second starting manner. It is therefore possible to both suppress the start shock and improve the acceleration responsiveness when the engine is started.

In the control apparatus according to the second aspect of the invention, the first starting manner is being selected in the case in which the rotational speed of the electric motor is lower than the lower-limit speed value that is minimally required to determine that the start shock caused upon the start of the engine in the second starting manner is tolerable. On the other hand, the second starting manner is being selected in the case in which the rotational speed of the electric motor is not lower than the lower-limit speed value.

It is therefore possible to both suppress the start shock and improve the acceleration responsiveness when the engine is started.

In the control apparatus according to the third aspect of the invention, the execution of the engine-start delay control is allowed when it is determined that the start of the engine in the second starting manner is ready to be executed. Thus, when the start of the engine in the second starting manner can be executed, it is possible to wait for switch of the engine starting manner to the second starting manner.

In the control apparatus according to the fourth aspect of the invention, in the case in which, when the start of the engine is requested, the requested drive amount is not realized by only the torque of the electric motor, the engine-start delay control is not executed or terminated, and one of the first and second starting manners is selected as the engine starting manner, so that the engine is started in the selected one of the first and second starting manners. Thus, the requested drive amount can be quickly realized by the torque of the engine.

In the control apparatus according to the fifth aspect of the invention, one of the first and second starting manners is selected as the engine starting manner, depending on the rotational speed of the electric motor and the transmission shaft torque, so that it is possible to both suppress the start shock and improve the acceleration responsiveness.

DETAILED DESCRIPTION OF PREFERRED EMBODIMENT

Hereinafter, there will be described preferred embodiment in detail with reference to the accompanying drawings.

Embodiment

Figure 1:
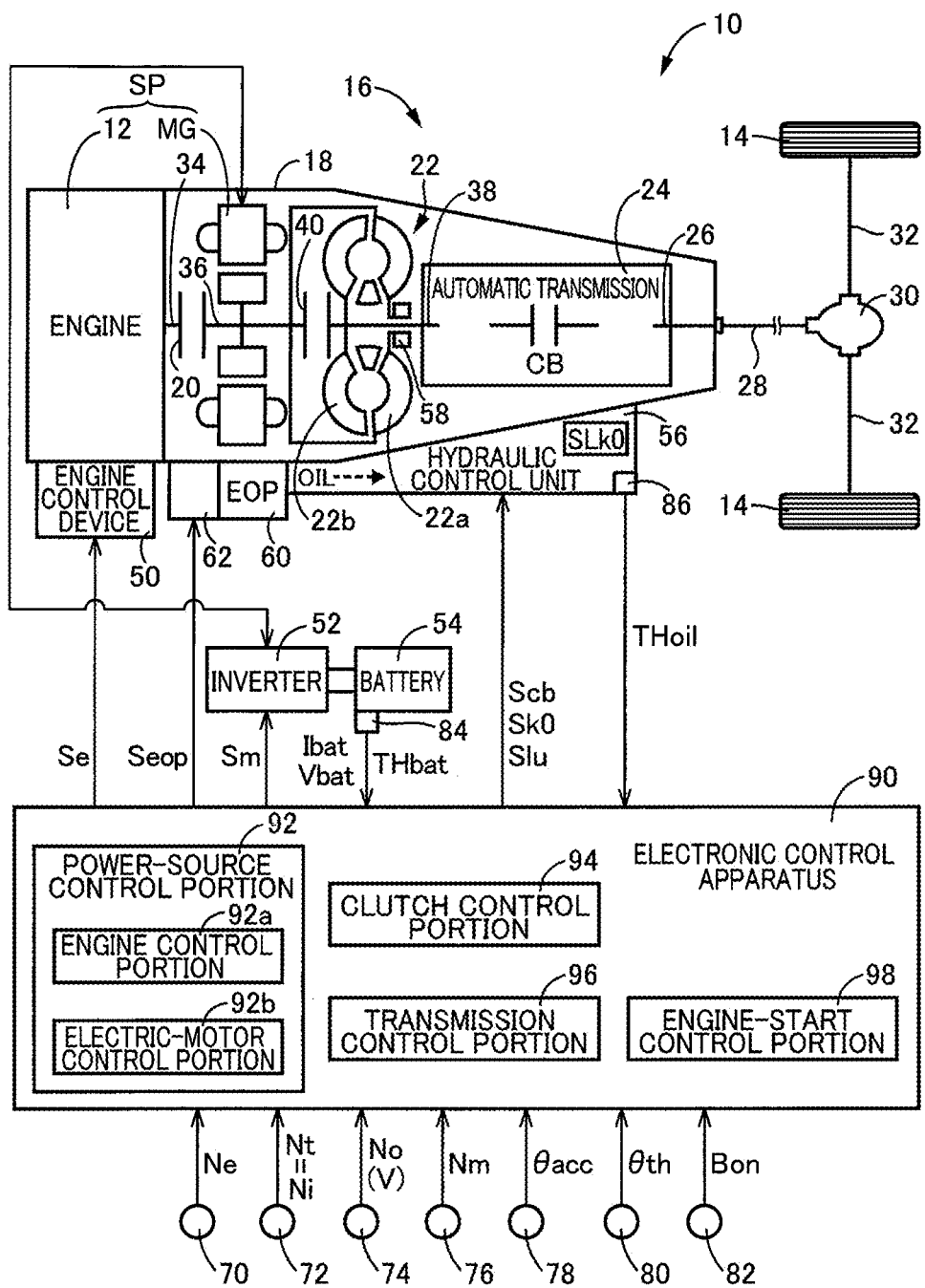
FIG. 1 is a view schematically showing a construction of a vehicle to which the present invention is to be applied, together with major portions of control functions and systems for executing various kinds of controls in the vehicle.

FIG. 1 is a view schematically showing a construction of a vehicle 10 to which the present invention is applied, for explaining major portions of control functions and control systems that are provided to perform various control operations in the vehicle 10. As shown in FIG. 1, the vehicle 10 is a hybrid electric vehicle including an engine 12 and an electric MG that cooperate with each other to constitute a power source SP for driving the vehicle 10. The vehicle 10 further includes drive wheels 14 and a power transmission device 16 that is provided in a power transmission path between the engine 12 and the drive wheels 14.

The engine 12 is a known internal combustion engine such as gasoline engine and diesel engine. The vehicle 10 is provided with an engine control device 50 that includes a throttle actuator, a fuel injection device and an ignition device. With the engine control device 50 being controlled by an electronic control apparatus 90 that is described below, an engine torque Te, which is a torque of the engine 12, is controlled.

The electric motor MG is a rotating electric machine having a function serving as a motor configured to generate a mechanical power from an electric power and a function serving as a generator configured to generate an electric power from a mechanical power. That is, the electric motor MG is a so-called "motor generator". The electric motor MG is connected to a battery 54 provided in the vehicle 10, through an inverter 52 provided in the vehicle 10. The battery 54 serves as an electric storage device configured to supply and receive an electric power to and from the electric motor MG. The inverter 52 is controlled by the electronic control apparatus 90 whereby an MG torque Tm as a torque of the electric motor MG is controlled. The MG torque Tm serves as a power driving torque when acting as a positive torque for acceleration, with the electric motor MG being rotated in a forward direction that is the same as a direction of rotation of the engine 12 during operation of the engine 12. The MG torque Tm serves as a regenerative torque when acting as a negative torque for deceleration, with the electric motor MG being rotated in the forward direction. The electric power corresponds to an electric energy unless they are to be distinguished from each other. The power corresponds to a force or a torque unless they are to be distinguished from each other.

The power transmission device 16 includes a casing 18, a K0 clutch 20, a torque converter 22 and an automatic transmission 24. The K0 clutch 20, torque converter 22 and automatic transmission 24 are disposed inside the casing 18 as a non-rotary member that is attached to a body of the vehicle 10. The K0 clutch 20 is a clutch that is disposed between the engine 12 and the electric motor MG in the power transmission path between the engine 12 and the drive wheels 14. The torque converter 22 is connected to the engine 12 through the K0 clutch 20. The automatic transmission 24 is connected to the torque converter 22, and is disposed between the torque converter 22 and the drive wheels 14 in the power transmission path between the engine 12 and the drive wheels 14. The automatic transmission 24 is a transmission that is disposed between the electric motor MG and the drive wheels 14 in the power transmission path between the engine 12 and the drive wheels 14. The power transmission device 16 further includes a propeller shaft 28 connected to a transmission output shaft 26 that is an output rotary member of the automatic transmission 24, a differential gear device 30 connected to the propeller shaft 28, and a pair of drive shafts 32 connected to the differential gear device 30. The power transmission device 16 still further includes an engine connection shaft 34 connecting between the engine 12 and the K0 clutch 20, and an electric-motor connection shaft 36 connecting between the K0 clutch 20 and the torque converter 22. The electric-motor connection shaft 36 is a transmission shaft to which the electric motor MG is connected in a power transmittable manner in the power transmission path between the engine 12 and the drive wheels 14 and to which the engine 12 is connected through the K0 clutch 20 in a power transmittable manner in the power transmission path. The K0 clutch 20 is a clutch provided between the engine 12 and the electric-motor connection shaft 36 in the power transmission path.

The electric motor MG is connected to the electric-motor connection shaft 36 in a power transmittable manner in the casing 18. The electric motor MG is disposed in the power transmission path between the engine 12 and the drive wheels 14, so as to be connected to the engine 12 and the drive wheels 14 in a power transmittable manner, more specifically, the electric motor MG is disposed in a power transmission path between the K0 clutch 20 and the torque converter 22, so as to be connected to the K0 clutch 20 and the torque converter 22 in a power transmittable manner. From another point of view, the electric motor MG is connected to the torque converter 22 and the automatic transmission 24 without through the K0 clutch 20 in a power transmittable manner.

The torque converter 22 includes a pump impeller 22a connected to the electric-motor connection shaft 36, and a turbine impeller 22b connected to a transmission input shaft 38 that is an input rotary member of the automatic transmission 24. The torque converter 22 is a fluid-type transmission device, and is configured to transmit the power of the power source SP constituted by the engine 12 and the electric motor MG, to the transmission input shaft 38, through fluid circulating in the torque converter 22. The torque converter 22 includes an LU clutch 40 configured to connect between the pump impeller 22a and the turbine impeller 22b, i.e., between the electric-motor connection shaft 36 and the transmission input shaft 38. The LU clutch 40 is a known lockup clutch serving as a direct connection clutch.

The automatic transmission 24 is a known automatic transmission of a planetary gear type which includes at least one planetary gear device (not shown) and an engagement device CB. The engagement device CB includes, for example, a plurality of hydraulically-operated frictional coupling devices each of which is configured to receive a CB hydraulic pressure PRcb that is a regulated hydraulic pressure supplied from a hydraulic control unit (hydraulic control circuit) 56, whereby a CB torque Tcb, i.e., torque capacity of each coupling device of the engagement device CB is changed and its controlled or operation state is switched among an engaged state, a slipping state and a released state, for example.

The automatic transmission 24 is a step-variable automatic transmission configured to establish a selected one of a plurality of gear positions, with a corresponding one or ones of the coupling devices of the engagement device CB being engaged, wherein the gear positions are different from each other in gear ratio (speed ratios) γat (=AT input rotational speed Ni/AT output rotational speed No). The automatic transmission 24 is configured to switch from one of the gear positions to another one of the gear positions, namely, to establish one of the gear positions which is selected, by the electronic control apparatus 90, depending on, for example, an accelerating operation made by a vehicle driver (operator) and a running speed V of the vehicle 10. The AT input rotational speed Ni is a rotational speed of the transmission input shaft 38, and is an input rotational speed of the automatic transmission 24. The AT input rotational speed Ni is equal to a turbine rotational speed Nt that is an output rotational speed of the torque converter 22. Therefore, the AT input rotational speed Ni can be represented by the turbine rotational speed Nt. The AT output rotational speed No is a rotational speed of the transmission output shaft 26, and is an output rotational speed of the automatic transmission 24.

The K0 clutch 20 is a hydraulically-operated frictional engagement device constituted by a multiple-disc type or single-disc type clutch, wherein the clutch may be of either wet type or dry type, for example. A controlled or operation state of the K0 clutch 20 is to be switched among an engaged state, a slipping state and a released state, with a K0 torque Tk0 (that corresponds to a torque capacity of the K0 clutch 20) being changed by a K0 hydraulic pressure PRk0 that is regulated and supplied by the hydraulic control unit 56.

In the vehicle 10, when the K0 clutch 20 is in the engaged state, the engine 12 and the torque converter 22 are connected to each other in a power transmittable manner. When the K0 clutch 20 is in the released state, a power transmission between the engine 12 and the torque converter 22 is cut off. Since the electric motor MG is connected to the torque converter 22, the K0 clutch 20 serves as a clutch configured to connect and disconnect between the engine 12 and the electric motor MG.

In the power transmission device 16, the power outputted from the engine 12 is transmitted, when the K0 clutch 20 is engaged, to the drive wheels 14 from the engine connection shaft 34 through sequentially the K0 clutch 20, electric-motor connection shaft 36, torque converter 22, automatic transmission 24, propeller shaft 28, differential gear device 30 and drive shafts 32, for example. Further, the power transmitted from the electric motor MG is transmitted, irrespective of the operation state of the K0 clutch 20, to the drive wheels 14 from the electric-motor connection shaft 36 through sequentially the torque converter 22, automatic transmission 24, propeller shaft 28, differential gear device 30 and drive shafts 32, for example. The automatic transmission 24 transmits a power source torque Tsp as a torque of the power source SP inputted to the electric-motor connection shaft 36, toward the drive wheels 14. The power source torque Tsp corresponds to a sum of the engine torque Te and the MG torque Tm. Thus, the power transmission device 16 transmits the power of the power source SP toward the drive wheels 14.

The vehicle 10 further includes an MOP 58 that is a mechanically-operated oil pump, an EOP 60 that is an electrically-operated oil pump, and a pump motor 62. The MOP 58 is connected to the pump impeller 22a, and is to be rotated and driven by the power source SP, so as to output a working fluid OIL that is to be used in the power transmission device 16. The pump motor 62 is a motor serving exclusively to rotate and drive the EOP 60. The EOP 60 outputs the working fluid OIL, when being rotated and driven by the pump motor 62. The working fluid OIL outputted by the MOP 58 and the EOP 60 is supplied to the hydraulic control unit 56. The hydraulic control unit 56, which receives the working fluid OIL as an original hydraulic pressure, supplies regulated hydraulic pressures that serve as the CB hydraulic pressure PRcb and the K0 hydraulic pressure PRk0, for example.

The vehicle 10 is provided with the electronic control apparatus 90 including a control apparatus for the vehicle 10. The electronic control apparatus 90 includes a so-called microcomputer incorporating a CPU, a ROM, a RAM and an input-output interface. The CPU performs various control operations of the vehicle 10, by processing various input signals, according to control programs stored in the ROM, while utilizing a temporary data storage function of the RAM. The electronic control apparatus 90 may be constituted by two or more control units exclusively assigned to perform respective different control operations such as an engine control operation, an electric-motor control operation, a clutch control operation and a transmission control operation.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne that is a rotational speed of the engine 12; an output signal of a turbine speed sensor 72 indicative of a turbine rotational speed Nt that is equal to the AT input rotational speed Ni; an output signal of an output speed sensor 74 indicative of the AT output rotational speed No corresponding to the vehicle running speed V; an output signal of a MG speed sensor 76 indicative of the motor rotational speed Nm; an output signal of an accelerator-opening degree sensor 78 indicative of an accelerator opening degree (accelerator operation degree) θacc representing an amount of accelerating operation made by the vehicle driver; an output signal of a throttle-opening degree sensor 80 indicative of a throttle opening degree θth which is an opening degree of an electronic throttle valve; an output signal of a brake switch 82 indicative of a signal representing a state in which a brake pedal is being operated by the vehicle driver so as to operate wheel brakes; an output signal of a battery sensor 84 indicative of a battery temperature THbat, a battery charging/discharging electric current Ibat and a battery voltage Vbat; and an output signal of a fluid temperature sensor 86 indicative of a working-fluid temperature THoil that is a temperature of the working fluid OIL in the hydraulic control unit 56.

The electronic control apparatus 90 calculates a battery charged amount SOC [%], for example, based on a charging/discharging electric current Ibat and a battery voltage Vbat. The battery charged amount SOC is a charged amount of the battery 54, and is a charged state value, i.e., a value indicative of a charged state of the battery 54. Further, the electronic control apparatus 90 calculates a maximum chargeable amount Win [W] and a maximum dischargeable amount Wout [W] of the battery 54, for example, based on the battery temperature THbat and the battery charged amount SOC. The maximum chargeable amount Win of the battery 54 is a maximum amount of the electric power that can be charged to the battery 54, and represents a limitation of the electric power inputted to the battery 54, namely, a limitation of input to the battery 54. The maximum dischargeable amount Wout of the battery 54 is a maximum amount of the electric power that can be discharged from the battery 54, and represents a limitation of the electric power outputted from the battery 54, namely, a limitation of output of the battery 54.

The electronic control apparatus 90 generates various output signals to the various devices provided in the vehicle 10, such as: an engine control command signal Se that is to be supplied to the engine control device 50 for controlling the engine 12, an MG control command signal Sm that is to be supplied to the inverter 52 for controlling the electric motor MG; a CB hydraulic control command signal Scb that is to be supplied to the hydraulic control unit 56 for controlling the operation states of the coupling devices of the engagement device CB; a K0 hydraulic control command signal Sk0 that is to be supplied to the hydraulic control unit 56 for controlling the K0 clutch 20; an LU hydraulic control command signal SLU that is to be supplied to the hydraulic control unit 56 for controlling the operation state of the LU clutch 40; and an EOP control command signal Seop that is to be supplied to the pump motor 62 for controlling the EOP 60.

There will be described the K0 hydraulic control command signal Sk0 as one of the hydraulic control command signals S. The electronic control apparatus 90 calculates a K0 command pressure value Spk0 that is a command value of the K0 hydraulic pressure PRk0 as a fluid pressure supplied from the hydraulic control unit 56 to the K0 clutch 20, namely, that is a command value for commanding the hydraulic control unit 56 to supply the regulated K0 hydraulic pressure PRk0 to the K0 clutch 20. The command value of the K0 hydraulic pressure PRk0 as the fluid pressure is a target pressure value commanded by the electronic control apparatus 90 to a working fluid OIL supplied to the K0 clutch 20 as an engagement device, so that an actual hydraulic pressure value that is an actual value of the K0 hydraulic pressure PRk0 supplied to the K0 clutch 20 is changed in accordance with the command value of the K0 hydraulic pressure PRk0. The electronic control apparatus 90 converts the K0 command pressure value Spk0 into a K0 command electric current value Sik0 for driving a K0 solenoid SLk0 that is provided in the hydraulic control unit 56. The K0 solenoid SLk0 is a solenoid valve through which the K0 hydraulic pressure PRk0 is to be outputted to the K0 clutch 20. The K0 command electric current value Sik0 is a command value of an electric current supplied to a solenoid driver as a drive circuit that is provided in the electronic control apparatus 90, for driving the K0 solenoid SLk0. The K0 hydraulic control command signal Sk0 is a drive current or drive voltage for causing the solenoid driver to drive the K0 solenoid SLk0 based on the K0 command electric current value Sik0. That is, the K0 command pressure value Spk0 is converted into the K0 hydraulic control command signal Sk0 that is supplied to the hydraulic control unit 56. In the following description of the present embodiment, the terms "K0 command pressure value Spk0" and "K0 hydraulic control command signal Sk0" are treated to be synonymous with each other, for convenience of the description.

For performing various control operations in the vehicle 10, the electronic control apparatus 90 includes a power-source control means in the form of a power-source control portion 92, a clutch control means in the form of a clutch control portion 94, a transmission control means in the form of a transmission control portion 96 and an engine-start control means in the form of an engine-start control portion 98.

The power-source control portion 92 has a function serving as an engine control means in the form of an engine control portion 92a for controlling operation of the engine 12 and a function serving as an electric-motor control means in the form of an electric-motor control portion 92b for controlling operation of the electric motor MG through the inverter 52. The engine control portion 92a and the electric-motor control portion 92b cooperate with each other to constitute a hybrid control means in the form of a hybrid control portion for executing a hybrid-drive control operation, for example, using the engine 12 and the electric motor MG through these control functions.

The power-source control portion 92 calculates a requested drive amount of the vehicle 10 requested by the vehicle driver, by applying the accelerator opening degree θacc and the vehicle running speed V, for examples, to a requested drive amount map that represents a pre-stored relationship obtained by experimentation or determined by an appropriate design theory. The requested drive amount is, for example, a requested drive torque Trdem of the drive wheels 14. From another point of view, the requested drive torque Trdem [Nm] is a requested drive power Proem [W] at the current vehicle running speed V. As the requested drive amount, another value such as a requested drive force Frdem [N] of the drive wheels 14 and a requested AT output torque of the transmission output shaft 26 may be used, too. In the calculation of the requested drive amount, it is also possible to use, for example, the AT output rotational speed No in place of the vehicle running speed V.

The power-source control portion 92 calculates a requested system shaft torque Tsysdem for realizing a requested drive torque Trdem, by taking account of various factors such as a transmission loss, an auxiliary load and the gear ratio γat of the automatic transmission 24. The requested system shaft torque Tsysdem is a requested torque value of a system shaft torque Tsys that is a transmission shaft torque, i.e., a torque applied to the electric-motor connection shaft 36. The system shaft torque Tsys is a part of the power source torque Tsp, and corresponds to a drive torque Tr that is transmitted through the automatic transmission 24 toward the drive wheels 14. For realizing the requested system shaft torque Tsysdem, the power-source control portion 92 outputs the engine control command signal Se and the MG control command signal Sm for controlling the engine 12 and the electric motor MG, respectively.

When the requested system shaft torque Tsysdem can be covered by only the output of the electric motor MG, the power-source control portion 92 establishes a motor driving mode, i.e., a BEV driving mode as a driving mode for driving the vehicle 10. When the BEV driving mode is established, the power-source control portion 92 causes the vehicle 10 to perform a motor running, i.e., an electric running (=BEV running) with the K0 clutch 20 being released and with only the electric motor MG serving as the power source SP. On the other hand, when the requested system shaft torque Tsysdem cannot be covered without at least the output of the engine 12, the power-source control portion 92 establishes another driving mode that is an engine driving mode, i.e., an HEV driving mode. When the HEV driving mode is established, the power-source control portion 92 causes the vehicle 10 to perform an engine running, i.e., a hybrid running (=HEV running) with the K0 clutch 20 being engaged and with at least the engine 12 serving as the power source SP. Further, even when the requested system shaft torque Tsysdem can be covered by only the output of the electric motor MG, the power-source control portion 92 establishes the HEV driving mode, for example, in a case in which the battery 54 needs to be charged or in a case in which the engine 12 or other component needs to be warmed up. The case in which the battery 54 needs to be charged corresponds to, for example, a case in which the battery charged amount SOC is reduced to be lower than a predetermined lower limit, or a case in which an energy efficiency can be improved by charge of the battery 54 even though the battery charged amount SOC not lower than the predetermined lower limit.

The transmission control portion 96 determines whether a shifting action is to be executed in the automatic transmission 24, by using, for example, a shifting map that represents a predetermined relationship, and outputs the CB hydraulic control command signal Scb, as needed, which is supplied to the hydraulic control unit 56, for executing the shifting action in the automatic transmission 24, depending on the determination using the shifting map. The shifting action is executed by the transmission control portion 96, for example, by switching at least one of the coupling devices of the engagement device CB from the engaged state to the released state while switching at least another one of the coupling devices of the engagement device CB from the released state to the engaged state. In the shifting map, the predetermined relationship has shifting lines in two-dimensional coordinates in which the vehicle running speed V and the requested drive torque Trdem as two variables are taken along respective two axes, wherein the shifting lines are used for the determination as to whether the shifting action is to be executed in the automatic transmission 22. In the shifting map, one of the two variables may be the AT output rotational speed No in place of the vehicle running speed V, and the other of the two variables may be any one of the requested drive force Frdem, accelerator opening degree θacc and throttle opening degree θth in place of the requested drive torque Trdem.

The engine-start control portion 98 determines whether an engine start request REQst is present or not, namely, whether the engine 12 is requested to be switched from its stopped state to its driven state. This determination is made, for example, depending on (i) whether the requested drive torque Trdem has been made larger than a range that can be covered by only the output of the electric motor MG in the BEV driving mode, (ii) whether the engine 12 or other component needs to be warmed up in the BEV driving mode, or (iii) whether the battery 54 needs to be charged in the BEV driving mode.

When determining that the engine start request REQst is present, the engine-start control portion 98 outputs, to the clutch control portion 94, a command requesting the K0 clutch 20 to be controlled such that an engine start control CTst is executed for starting the engine 12. The clutch control portion 94 outputs, to the hydraulic control unit 56, the hydraulic control command signal Sk0 for controlling the K0 clutch 20 such that the K0 clutch 20 is switched from the released state to the engaged state for obtaining the K0 torque Tk0 to transmit a cranking torque Ter toward the engine 12. The cranking torque Ter is a predetermined torque required by cranking for increasing the engine rotational speed Ne.

Further, when determining that the engine start request REQst is present, the engine-start control portion 98 outputs, to the power-source control portion 92, a command requesting the engine 12 and the electric motor MG to be controlled for executing the engine start control CTst. The power-source control portion 92, particularly, the electric-motor control portion 92b outputs, to the inverter 52, the MG control command signal Sm by which the cranking torque Ter is to be outputted by the electric motor MG together with switching of the K0 clutch 20 into the engaged state, namely, in conjunction with the cranking of the engine 12 by the K0 clutch 20. Moreover, in this instance, the power-source control portion 92, particularly, the engine control portion 92a outputs, to the engine control device 50, the engine control command signal Se by which fuel supply and engine ignition are to be started in conjunction with the cranking of the engine 12 by the K0 clutch 20.

When the engine 12 is cranked, a reaction force is generated as a result of engagement of the K0 clutch 20. This reaction force causes drop of the drive torque Tr due to inertia of the engine 12 during the start of the engine 12 in the BEV running of the vehicle 10. Therefore, when the engine 12 is to be cranked, the MG torque Tm is increased by an amount corresponding to the cranking torque Ter that is transmitted through the K0 clutch 20. The cranking torque Ter, which is added in the engine start control CTst, serves to cancel the reaction torque, and corresponds to a torque for compensating the reaction torque. The cranking torque Tcr, which is the K0 torque Tk0 required for cranking the engine 12, is to be transmitted from the electric motor MG to the engine 12 through the K0 clutch 20. The cranking torque Tcrn is, for example, a constant torque that is predetermined based on, for example, specifications of the engine 12 and an engine starting type, i.e., a starting manner (=starting type) of the engine 12.

That is, in the engine start control CTst during the BEV running, in addition to the MG torque Tm used as the drive torque Tr, the MG torque Tm used as the cranking torque Ter is outputted from the electric motor MG. To this end, during the BEV running, it is necessary to secure the cranking torque Ter in preparation for the engine start control CTst so that the drive torque Tr does not drop during the engine start control CTst. Therefore, the determination as to whether the requested drive torque Trdem can be covered by only the output of the electric motor MG or not, is made by comparing the requested drive torque Trdem with a torque value obtained by subtracting the cranking torque Ter from a maximum MG torque Tmmax that is an outputtable maximum torque of the electric motor MG. During the BEV running, an upper limit of the system shaft torque Tsys, i.e., the MG torque Tm is the torque value obtained by subtracting the cranking torque Ter from the maximum MG torque Tmmax. In the following description of the present embodiment, the above-described torque value obtained by subtracting the cranking torque Tcr from the maximum MG torque Tmmax will be referred to as "MG torque upper limit guard value Tmul". The maximum MG torque Tmmax is a maximum value of the MG torque Tm, which is dependent on the maximum dischargeable amount Wout of the battery 54 and/or a rating of the electric motor MG.

Figure 2:
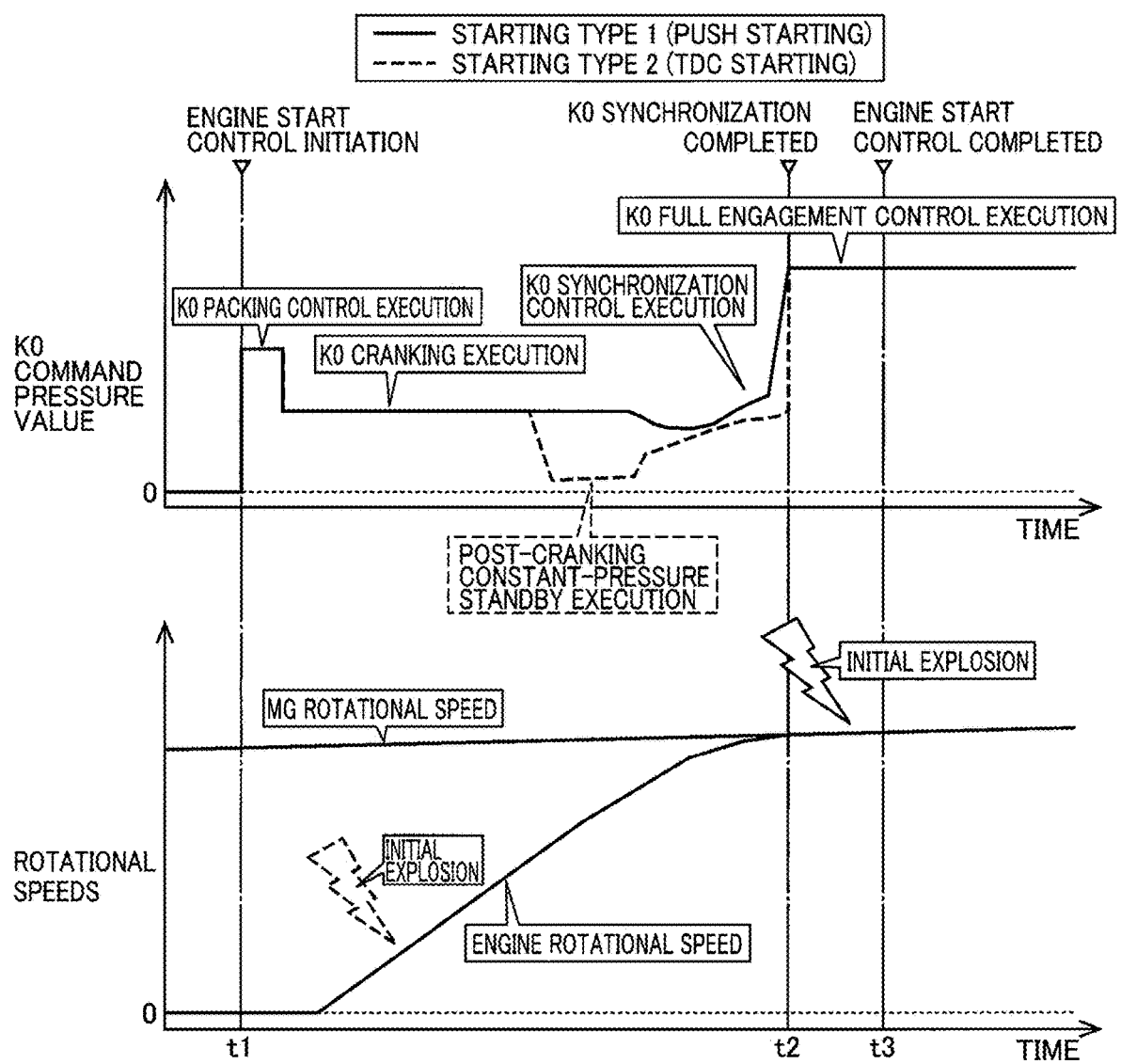
FIG. 2 is a view showing an example of a time chart where an engine start control is executed.

FIG. 2 is a view showing an example of a time chart where the engine start control CTst is executed. In FIG. 2, a time point t1 represents a time point at which the engine start control CTst is initiated upon determination of presence of the engine start request REQst, for example, as a result of further depression of an accelerator pedal by the vehicle driver during the BEV running. After initiation of the engine start control CTst, a K0 packing control, i.e., a packing control for the K0 clutch 20 is executed. The packing control is a control that is to be executed to place the frictional engagement device into a packing completed state in which a pack clearance in each friction plate is eliminated in the frictional engagement device. The packing completed state of the frictional engagement device is a state in which the frictional engagement device starts to have the torque capacity if the hydraulic pressure supplied to the frictional engagement device is increased from the packing completed state. After the K0 packing control has been completed, a K0 cranking, i.e., a cranking is executed by the K0 clutch 20 to transmit the cranking torque Tcr toward the engine 12 so as to crank the engine 12.

After the engine rotational speed Ne has been increased by the K0 cranking, a K0 synchronization control, i.e., a synchronization control is executed by the K0 clutch 20 to synchronize the engine rotational speed Ne with the MG rotational speed Nm (see solid lines in FIG. 2). The engine rotational speed Ne corresponds to a rotational speed of the engine connection shaft 34, and is equal to an input rotational speed of the K0 clutch 20. The MG rotational speed Nm corresponds to a rotational speed of the electric-motor connection shaft 36, and is equal to an output rotational speed of the K0 clutch 20. That is, the synchronization between the engine rotational speed Ne and the MG rotational speed Nm is synonymous with synchronization between the input and output rotational speeds of the K0 clutch 20. When a K0 synchronization, i.e., the synchronization between the input and output rotational speeds of the K0 clutch 20 is completed (see a time point t2), namely, when the switching of the K0 clutch 20 into the engaged state is completed, the engine ignition is initiated whereby an initial explosion is caused in the engine 12 (see solid lines in FIG. 2). After the K0 synchronization has been completed, a K0 full engagement control is executed to maintain the fully engaged state of the K0 clutch 20 (see after the time point t2). Then, the engine start control CTst is completed (see a time point t3) when the engine torque Te becomes outputted stably in accordance with the engine control command signal Se. In the following description of the present embodiment, an engine start type in which the engine 12 is started by being initially exploded after the engine rotational speed Ne has been increased by cooperation of the K0 clutch 20 and the electric motor MG to the K0 synchronization, will be referred to as "push starting manner", i.e., "PUSH starting type". The PUSH starting type is a first starting manner, i.e., a starting type 1 in which the engine 12 is exploded after completion of the K0 synchronization achieved by increase of the engine rotational speed N that is made by the cranking torque Tcr, namely, in which the engine 12 is ignited after completion of the K0 synchronization achieved by increase of the engine rotational speed N that is made by the K0 clutch 20 without the fuel supply to the engine 12.

In the present embodiment, it is possible to execute another starting type, as indicated by broken lines in FIG. 2, which is other than the PUSH starting type (see the solid lines in FIG. 2). As indicated by the broken lines in FIG. 2, the engine ignition is initiated in an early stage of increase of the engine rotational speed Ne by the K0 cranking, whereby the engine 12 is initially exploded before the K0 synchronization. Further, as indicated by the broken lines in FIG. 2, after the K0 cranking, a post-cranking constant-pressure standby is executed to keep the K0 torque TK0 at a predetermined torque Tk0f that is lower than the cranking torque Tcr, for waiting until the switching of the K0 clutch 20 into the engaged state. The K0 command pressure value Spk0 in execution of the post-cranking constant-pressure standby is in almost the same level as the K0 hydraulic pressure PRk0 required for maintaining the packing completed state or the slipping state of the K0 clutch 20, and is for realizing the K0 torque TK0 that avoids disturbance to the complete explosion of the engine 12. In the execution of the post-cranking constant-pressure standby, the engine rotational speed Ne is increased exclusively by combustion torque of the engine 12 rather than by the K0 torque Tk0. In the execution of the post-cranking constant-pressure standby, when the self-rotation of the engine 12 is stabilized by explosion of the engine 12, namely, when the engine 12 is in complete explosion state, the K0 synchronization control is executed and the K0 synchronization is completed. The K0 synchronization control may be initiated after the engine rotational speed Ne has reached the MG rotational speed Nm. Therefore, after the initial explosion of the engine 12, the engine rotational speed Ne is increased by the engine torque Te toward the K0 synchronization. In the following description of the present embodiment, the engine start type in which the engine 12 is started by being initially exploded, for example, in the early stage of the K0 cranking before the K0 synchronization, will be referred to as "early starting manner", i.e., "TDC starting type". The TDC starting type is a second starting manner, i.e., a starting type 2 in which the engine 12 is exploded in process to the completion of the K0 synchronization and then the engine rotational speed Ne is increased by at least the engine torque Te after explosion of the engine 12. The PUSH starting type indicated by the solid lines and the TDC starting type indicated by the broken lines are different from each other in period of the engine start control CTst. However, in FIG. 2, they are illustrated as if being the same in the period, for convenience of the illustration.

As shown in FIG. 2, in the engine start control CTst, the engine-start control portion 98 controls the K0 clutch 20 such that the cranking torque Ter is transmitted through the K0 clutch 20 and the K0 synchronization is completed, and controls the electric motor MG such that the cranking torque Ter is outputted in conjunction with the cranking of the engine 12. Further, in the engine start control CTst, the engine-start control portion 98 controls the engine 12 such that operation of the engine 12 is initiated in conjunction with the cranking of the engine 12. The engine-start control portion 98 executes a selected one of the engine start control CTst of the PUSH starting type and the engine start control CTst of the TDC starting type.

In the TDC starting type, the engine rotational speed Ne is increased by the self-rotation of the engine 12 so that the required cranking torque Ter is made smaller than in the PUSH starting type. Thus, the TDC starting type is advantageous over the PUSH starting type in terms of energy efficiency and start responsiveness. However, if the engine start control CTst of the TDC starting type is executed, for example, when the MG rotational speed Nm is low during the BEV running, the engine rotational speed Ne is likely to reach the rotational speed of the K0 synchronization before the K0 clutch 20 is placed into the released state by execution of the post-cranking constant-pressure standby. That is, a time length from the initiation of the engine start control CTst until the K0 synchronization is reduced as an estimated MG rotational speed Nme is reduced, wherein the estimated MG rotational speed Nme is an estimated speed value of the MG rotational speed Nm at an estimated K0 synchronization point that is a time point of the K0 synchronization in an assumed case in which the engine start control CTst of the TDC starting type is executed. Therefore, in process of execution of the post-cranking constant-pressure standby, as the estimated MG rotational speed Nme is lower, the actual value of the K0 hydraulic pressure PRk0 is more unlikely to be reduced and an estimated K0 torque Tk0e (that is the K0 torque Tk0 at the estimated K0 synchronization point) is more likely to be made larger. As the estimated K0 torque Tk0e is larger, a start shock, which is caused by transmission of inertia of the engine 12 through the K0 clutch 20 to the electric-motor connection shaft 36, is more likely to exceed a tolerable range. Further, as the gear position established in the automatic transmission 24 is lower, a shock felt by the vehicle driver is likely to be increased so that the start shock is more likely to be problematic. Therefore, when the MG rotational speed Nm is in a low range or other range in which the start shock is likely to be problematic, it is preferable to execute the engine start control CTst of the PUSH starting type.

Thus, the engine-start control portion 98 selects the PUSH starting type in a case in which the MG rotational speed Nm is lower than an MG lower-limit speed value Nmll that is minimally required to determine that the start shock caused in execution of the engine start control CTst of the TDC starting type is tolerable. However, the engine-start control portion 98 selects the TDC starting type in a case in which the MG rotational speed Nm is not lower than the MG lower-limit speed value Nmll.

Figure 3:
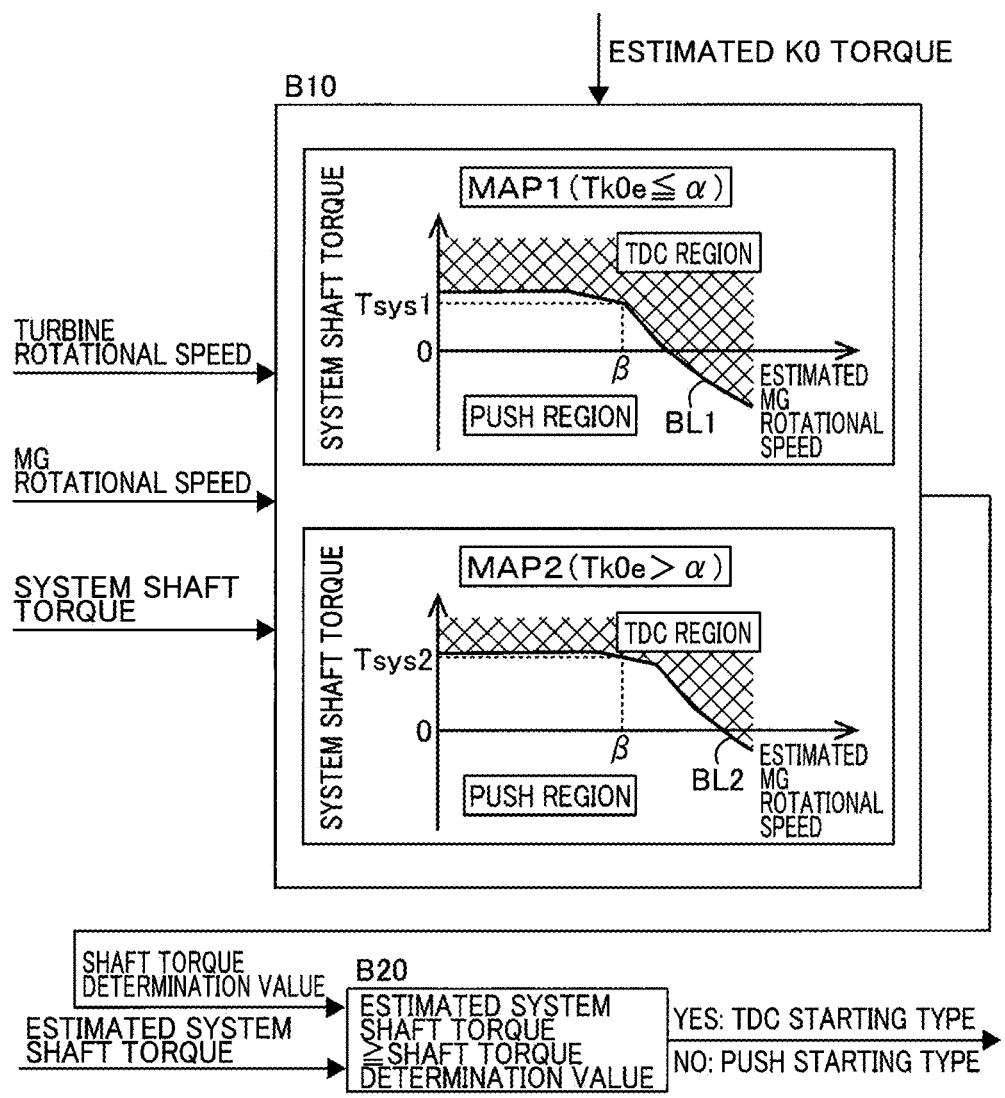
FIG. 3 is a view showing, by way of example, a method of determining an engine starting type.

FIG. 3 is a view showing, by way of example, a method of selecting or determining an engine starting type. In FIG. 3, each of "MAP1" and "MAP2" is a TDC-output allowance system-shaft-torque map representing a predetermined relationship and a border line BL (BL1, BL2) in two-dimensional coordinates in which the estimated MG rotational speed Nme and the system shaft torque Tsys as two variables are taken along respective two axes, wherein the border line BL defines "TDC REGION" and "PUSH REGION". The "TDC REGION" is a region in which the start shock is tolerable even if the engine start control CTst of the TDC starting type is executed. The "PUSH REGION" is a region in which the start shock is not tolerable if the engine start control CTst of the TDC starting type is executed. The "MAP1" is a torque map MAP1 that is used for calculating a shaft torque determination value when the estimated K0 torque Tk0e is not higher than a predetermined torque capacity a. The "MAP2" is a torque map MAP2 that is used for calculating a shaft torque determination value when the estimated K0 torque Tk0e is higher than the predetermined torque capacity a. Since the start shock is more likely to exceed the tolerable range as the estimated K0 torque Tk0e is higher, the "PUSH REGION" is made wider in the torque map MAP2 than in the torque map MAP1, and the "TDC REGION" is made narrower in the torque map MAP2 than in the torque map MAP1. The predetermined torque capacity a is a threshold value for selecting one of the torque maps MAP1, MAP2 as the TDC-output allowance system-shaft-torque map that is used for calculating a shaft torque determination value Tsysj. The shaft torque determination value Tsysj is a predetermined threshold value for determining whether the start shock is within the tolerable range or not when the engine start control CTst of the TDC starting type is executed, by comparing the estimated system shaft torque Tsyse (i.e., the system shaft torque Tsys at the estimated K0 synchronization point) with the shaft torque determination value Tsysj.

At block B10 in FIG. 3, a calculation is made based on a current value of the turbine rotational speed Nt, to calculate an estimated-MG-rotational-speed calculation turbine rotational speed Nte that is used for calculating the estimated MG rotational speed Nme. Specifically, the estimated-MG-rotational-speed calculation turbine rotational speed Nte is obtained by subtracting a deceleration correction amount from the current value of the turbine rotational speed Nt, wherein the deceleration correction amount is set to zero when the vehicle 10 is in a driving state. Further, the estimated MG rotational speed Nme is calculated by applying the estimated-MG-rotational-speed calculation turbine rotational speed Nte, a current value of the MG rotational speed Nm and a current value of the system shaft torque Tsys into a predetermined estimated-MG-rotational-speed calculation map. Each of the current values is a value at a time point at which the engine starting type is determined. Further, the estimated K0 torque Tk0e is calculated by applying the current value of the MG rotational speed Nm, the current value of the system shaft torque Tsys and the current value of the turbine rotational speed Nt into a predetermined estimated-K0-torque calculation map. Moreover, the estimated system shaft torque Tsyse is calculated by applying the current value of the MG rotational speed Nm, the current value of the system shaft torque Tsys and the current value of the turbine rotational speed Nt into a predetermined estimated-system-shaft-torque calculation map.

When the calculated estimated MG rotational speed Nme is a speed value β, a torque value Tsys1 is obtained as the shaft torque determination value Tsysj in the torque map MAP1, and a torque value Tsys2 is obtained as the shaft torque determination value Tsysj in the torque map MAP2, wherein the torque value Tsys2 is higher than the torque value Tsys1.

At block B20 in FIG. 3, it is determined whether the estimated system shaft torque Tsyse is higher than or equal to the shaft torque determination value Tsysj calculated with use of one of the torque map MAP1 and the torque map MAP2. When an affirmative determination is made in this determination, the TDC starting type is allowed so that the TDC starting type is selected as the engine starting type. On the other hand, when a negative determination is made in this determination, the TDC starting type is not allowed so that the PUSH starting type TDC starting type is selected as the engine starting type. It is noted, in FIG. 3, the system shaft torque Tsys may be replaced by the requested system shaft torque Tsysdem.

Referring to FIG. 3, the engine-start control portion 98 selects one of the PUSH starting type and the TDC starting type as the engine starting type, depending on the MG rotational speed Nm and the system shaft torque Tsys.

By the way, there is a case in which the accelerator is placed in an ON state or is further depressed by the vehicle driver during execution of the engine start control CTst of the PUSH starting type that has been selected as the engine starting type. In such a case, since the PUSH starting type is inferior to the TDC starting type in the start responsiveness, there is a risk that the acceleration responsiveness would be reduced.

In the present embodiment, in a case in which the PUSH starting type is selected as the engine starting type with the engine start request REQst is being present, initiation of the engine start control CTst of the PUSH starting type is delayed. The case in which the PUSH starting type is selected as the engine starting type is, for example, a case in which the MG rotational speed Nm is low so that the start shock worsens if the engine start control CTst of the TDC starting type is executed. There is a possibility that the MG rotational speed Nm is increased during delay of initiation of the engine start control CTst, or that the MG rotational speed Nm is increased with increase of the requested system shaft torque Tsysdem during execution of the engine start control CTst. Therefore, the PUSH starting type may be switched to the TDC starting type as the selected engine starting type in a case in which, during delay of initiation of the engine start control CTst, the MG rotational speed Nm is increased, for example, so that it can be determined that the start shock is not problematic even if the engine start control CTst of the TDC starting type is executed.

In a case in which the requested system shaft torque Tsysdem can be covered by only the output of the electric motor MG, even in presence of the engine start request REQst, for example, due to need to warm up the engine 12 or other component or need to charge the battery 54, discomfort is unlikely to be given to the vehicle driver even if the initiation of the engine start control CTst is delayed. In a case in which the requested system shaft torque Tsysdem cannot be covered by only the output of the electric motor MG, the engine start control CTst may be immediately executed. On the other hand, in a case in which the requested system shaft torque Tsysdem can be covered by even only the output of the electric motor MG, the initiation of the engine start control CTst may be delayed. However, in a case in which the TDC starting type is selected as the engine starting type, the engine start control CTst of the TDC starting type may be executed immediately.

That is, the engine-start control portion 98 executes the engine-start delay control CTdlyst for delaying the engine start control CTst, in a case in which, when the engine start request REQst is present, the requested drive torque Trdem can be realized by even only the MG torque Tm and the PUSH starting type is being selected as the engine starting type. Further, the engine-start control portion 98 terminates the engine-start delay control CTdlyst and executes the engine start control CTst of the PUSH starting type, in a case in which a predetermined time TMf has elapsed from initiation of the engine-start delay control CTdlyst. Moreover, the engine-start control portion 98 terminates the engine-start delay control CTdlyst and executes the engine start control CTst of the PUSH starting type, in a case in which the PUSH starting type has been switched to the TDC starting type as the selected engine starting type before elapse of the predetermined time TMf. The predetermined time TMf is a predetermined waiting time during which, for example, even if the engine start control CTst is delayed, discomfort is unlikely to occur.

Specifically, the engine-start control portion 98 determines whether the engine start request REQst is present without the engine start control CTst having been initiated, or not. When determining that the engine start request REQst is not present either with or without the engine start control CTst having been initiated, or when determining that the engine start control CTst has been initiated with the engine start request REQst being either present or absent, the engine-start control portion 98 does not execute the engine-start delay control CTdlyst.

When determining that the engine start request REQst is present without the engine start control CTst having been initiated, the engine-start control portion 98 determines whether the requested drive torque Trdem can be realized by even only the MG torque Tm, or not. That is, the engine-start control portion 98 determines whether more MG torque Tm is available or not, namely, whether the requested drive torque Trdem can be covered by even only the MG torque Tm even if the engine-start delay control CTdlyst is executed.

Figure 4:
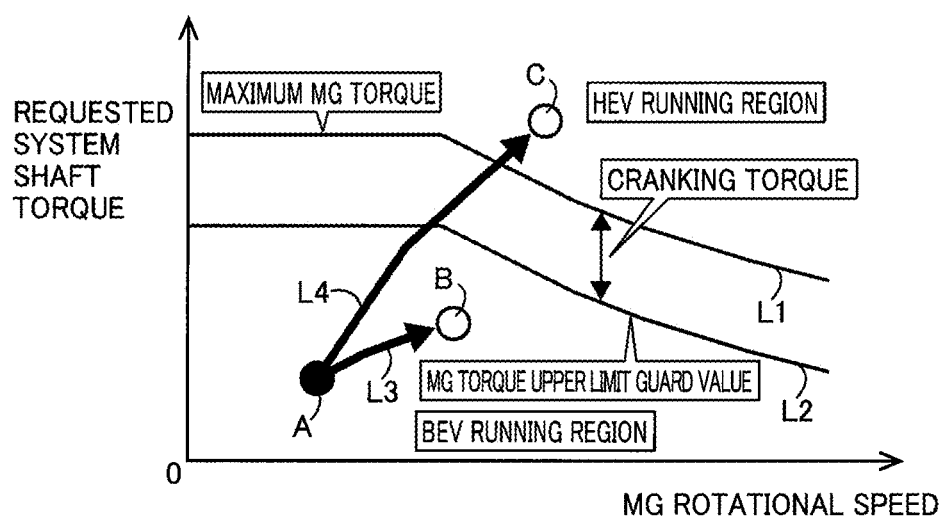
FIG. 4 is a view for explaining determination as to whether more MG torque is available or not, by using a driving-mode switch map.

FIG. 4 is a view for explaining determination as to whether more MG torque Tm is available or not, by using a driving-mode switch map that represents a predetermined relationship. In the driving-mode switch map shown in FIG. 4, the predetermined relationship has border lines in two-dimensional coordinates in which the MG rotational speed Nm and the requested system shaft torque Tsysdem as two variables are taken along respective two axes, wherein each of the border lines is used to define a border between "BEV RUNNING REGION" and "HEV RUNNING REGION". Solid line L1 represents the maximum MG torque Tmmax, while solid line L2 represents the MG torque upper limit guard value Tmul. The "BEV RUNNING REGION" is a region in which the BEV driving mode is established as the driving mode, while the "HEV RUNNING REGION" is a region in which the HEV driving mode is established as the driving mode. When the BEV driving mode is being established, the solid line 2 is used as one of the border lines between the "BEV RUNNING REGION" and "HEV RUNNING REGION". When the HEV driving mode is being established, namely, when the cranking torque Ter does not have to be reserved, the solid line 1 is used as another one of the border lines between the "BEV RUNNING REGION" and "HEV RUNNING REGION".

Black circle mark A indicates a state of the vehicle 10 before the engine start request REQst is made. Each of white circle marks B, C indicates the state of the vehicle 10 when the engine start request REQst is made. In a case indicated by solid line L3, namely, in a case in which the state of the vehicle 10 is shifted from the black circle mark A to the white circle mark B when the engine start request REQst is made, it is determined that more MG torque Tm is available so that the requested drive torque Trdem can be covered by even only the MG torque Tm. On the other hand, in a case indicated by solid line L4, namely, in a case in which the state of the vehicle 10 is shifted from the black circle mark A to the white circle mark C when the engine start request REQst is made, it is determined that more MG torque Tm is not available.

When determining that more MG torque Tm is not available, the engine-start control portion 98 does not execute the engine-start delay control CTdlyst, or terminates the engine-start delay control CTdlyst if the engine-start delay control CTdlyst is being executed. Further, the engine-start control portion 98 selects one of the PUSH starting type and the TDC starting type as the engine starting type (see FIG. 3), and then executes the engine start control CTs of the selected engine starting type. Thus, in a case in which the requested drive torque Trdem cannot be realized by only the MG torque Tm with the engine start request REQst being present, the engine-start control portion 98 does not execute the engine-start delay control CTdlyst or terminates the engine-start delay control CTdlyst, and then executes the engine start control CTst of the selected engine starting type. It is noted that, when determining that more MG torque Tm is not available, the engine-start control portion 98 may select the TDC starting type as the engine starting type and execute the engine start control CTst of the selected TDC starting type, focusing on improving the acceleration responsiveness rather than suppressing the start shock.

When determining that more MG torque Tm is available, the engine-start control portion 98 determines whether the engine start control CTst of the TDC starting type, i.e., early start of the engine 12 is ready to be executed or not. The determination as to whether the early start of the engine 12 is ready to be executed or not corresponds to a determination as to whether the early start of the engine 12 is allowable or not. The engine-start control portion 98 makes the determination as to whether the early start of the engine 12 is ready to be executed or not, for example, depending on whether a pressure in a high-pressure fuel supply system in the engine control device 50 has been increased sufficiently or not.

When the early start of the engine 12 is not ready to be executed, it is not necessary to execute the engine-start delay control CTdlyst to wait for the TDC starting type to be ready. Therefore, when determining that the early start of the engine 12 is not ready to be executed, the engine-start control portion 98 does not execute the engine-start delay control CTdlyst or terminates the engine-start delay control CTdlyst, and selects one of the PUSH starting type and the TDC starting type as the engine starting type (see FIG. 3) so as to execute the engine start control CTst of the selected engine starting type.

Being ready to execute the early start of the engine 12 is one of conditions required to execute the engine-start delay control CTdlyst. That is, when determining that the engine start control CTst of the TDC starting type is ready to be executed, the engine-start control portion 98 allows execution of the engine-start delay control CTdlyst.

When determining that the early start of the engine 12 is ready to be executed, the engine-start control portion 98 determines whether the state of the vehicle 10 is in a PUSH start region, i.e., a region in which the start shock is intolerable if the engine start control CTst of the TDC starting type is executed (see FIG. 3). When determining that the state of the vehicle 10 is not in the PUSH start region but in a TDC start region, i.e., a region in which the start shock is tolerable even if the engine start control CTst of the TDC starting type is executed, the engine-start control portion 98 does not execute the engine-start delay control CTdlyst or terminates the engine-start delay control CTdlyst, and selects the TDC starting type as the engine starting type so as to execute the engine start control CTst of the selected TDC starting type.

When determining that the state of the vehicle 10 is in the PUSH start region, the engine-start control portion 98 determines whether a time having elapsed from initiation of the engine-start delay control CTdlyst is shorter than the predetermined time TMf or not, namely, whether the engine-start delay control CTdlyst is before timeout or not. It is noted that, if the engine-start delay control CTdlyst has not yet being initiated, the time having elapsed from the initiation of the engine-start delay control CTdlyst is regarded as zero so that it is determined that the engine-start delay control CTdlyst is before the timeout.

When determining that the engine-start delay control CTdlyst is before the timeout, the engine-start control portion 98 continues or initiates the engine-start delay control CTdlyst, namely, executes the engine-start delay control CTdlyst. When determining that the engine-start delay control CTdlyst is after the timeout, the engine-start control portion 98 terminates the engine-start delay control CTdlyst, and then selects the PUSH starting type as the engine starting type, so as to execute the engine start control CTst of the selected PUSH starting type.

Figure 5:
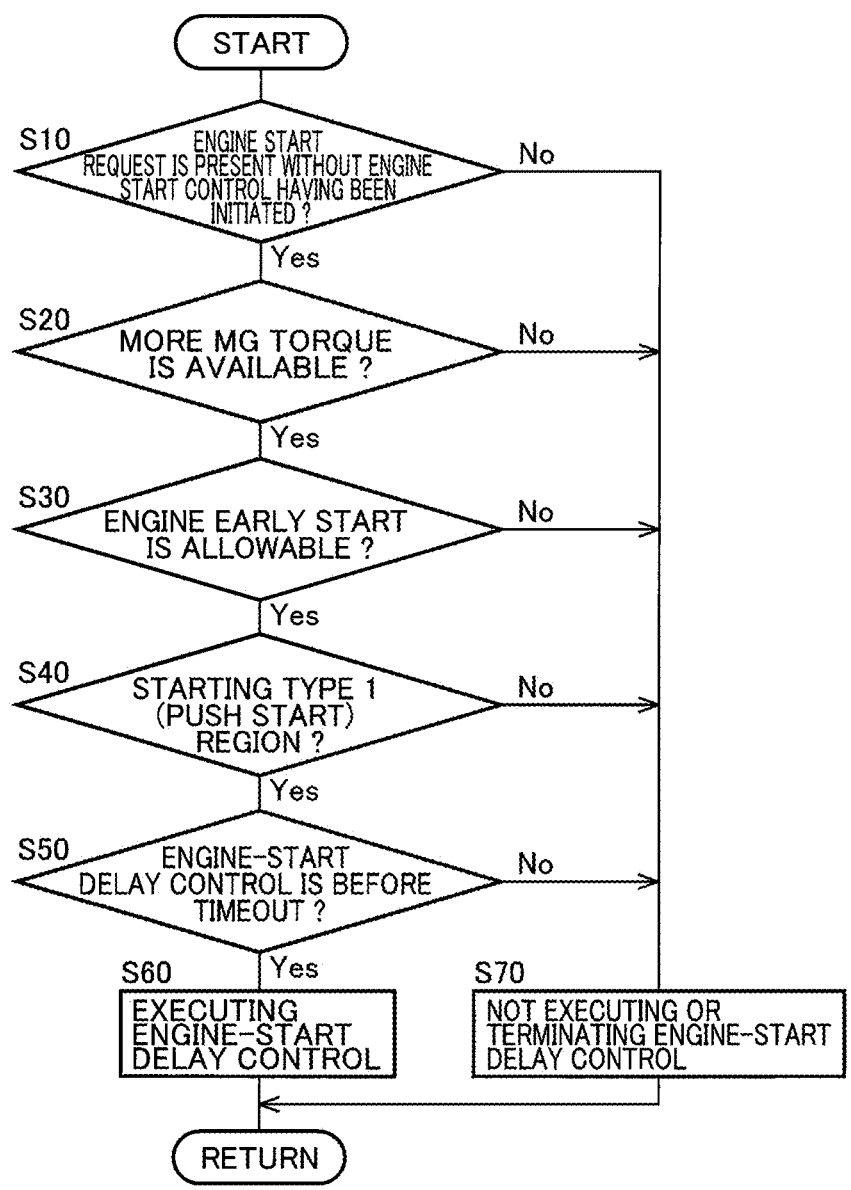
FIG. 5 is a flow chart showing a part of a control routine to be executed by an electronic control apparatus, so as to suppress a start shock and to improve an acceleration responsiveness in an engine start control.

FIG. 5 is a flow chart showing a main part of a control routine to be executed by the electronic control apparatus 90, so as to suppress the start shock and to improve the acceleration responsiveness in the engine start control CTst. This control routine is executed in a repeated manner.

Each of steps S10 through S70 of the control routine shown in the flow chart of FIG. 5 corresponds to function of the engine-start control portion 98. As shown in FIG. 5, the control routine is initiated with step S10 that is implemented to determine whether the engine start request REQst is present without the engine start control CTst having been initiated, or not. When an affirmative determination is made at step S10, step S20 is implemented to determine whether more MG torque Tm is available or not. When an affirmative determination is made at step S20, step S30 is implemented to determine whether the early start of the engine 12 is allowable or not. When an affirmative determination is made at step S30, step S40 is implemented to determine whether the state of the vehicle 10 is in the PUSH start region or not. When an affirmative determination is made at step S40, step S50 is implemented to determine whether the engine-start delay control CTdlyst is before the timeout or not. When an affirmative determination is made at step S50, step S60 is implemented to continue or initiate the engine-start delay control CTdlyst, namely, execute the engine-start delay control CTdlyst, so as to wait for seeing if the state of the vehicle 10 transitions from the PUSH start region to the TDC start region. When the state of the vehicle 10 has transitioned to the TDC start region, a negative determination is made at step S40, and the engine-start delay control CTdlyst is terminated (see step S70 described below). On the other hand, when a negative determination is made at any one of steps S10, S20, S30, S40 and S50, the control flow goes to step S70 in which the engine-start delay control CTdlyst is not executed or the engine-start delay control CTdlyst is terminated when the engine-start delay control CTdlyst is being executed. Thus, when the engine start request REQst is made, one of the PUSH starting type and the TDC starting type is selected as the engine starting type, depending on the determination made at each step, and the engine start control CTs of the selected engine starting type is executed.

As described above, in the present embodiment, the engine-start delay control CTdlyst is executed in the case in which, when the engine start request REQst is present, the requested drive torque Trdem is realized by only the MG torque Tm and the PUSH starting type is being selected as the engine starting type. Then, in the case in which the predetermined time TMf elapses from initiation of the engine-start delay control CTdlyst, the engine-start delay control CTdlyst is terminated and the engine start control CTst of the PUSH starting type is executed. On the other hand, in the case in which the engine starting type is switched from the PUSH starting type to the TDC starting type before the predetermined time TMf elapses from initiation of the engine-start delay control CTdlyst, the engine-start delay control CTdlyst is terminated and the engine start control CTst of the TDC starting type is executed. Thus, when the TDC starting type cannot be selected as the engine starting type, the start of the engine is waited for the predetermined time TMf. Then, while the engine start is being waited, if the TDC starting type becomes selectable, the engine starting type is switched from the PUSH starting type to the TDC starting type. It is therefore possible to both suppress the start shock and improve the acceleration responsiveness in the engine start control CTst.

In the present embodiment, the PUSH starting type is selected in the case in which the MG rotational speed Nm is lower than the MG lower-limit speed value Nmll. On the other hand, the TDC starting type is selected in the case in which the MG rotational speed Nm is not lower than the MG lower-limit speed value Nmll. It is therefore possible to both suppress the start shock and improve the acceleration responsiveness when the engine is started.

In the present embodiment, the execution of the engine-start delay control CTdlyst is allowed when it is determined that the engine start control CTst of the TDC starting type is ready to be executed. Thus, when the engine start control CTst of the TDC starting type can be executed, it is possible to wait for switch of the engine starting type to the TDC starting type.

In the present embodiment, in the case in which, when the engine start request REQst is present, the requested drive torque Trdem cannot be realized by only the MG torque Tm, the engine-start delay control CTdlyst is not executed or terminated, and one of the PUSH starting type and the TDC starting type is selected as the engine starting type, so that the engine start control CTs of the selected one of the PUSH starting type and the TDC starting type is executed. Thus, the requested drive torque Trdem can be quickly realized by the engine torque Te.

In the present embodiment, one of the PUSH starting type and the TDC starting type is selected as the engine starting type, depending on the MG rotational speed Nm and the system shaft torque Tsys, so that it is possible to both suppress the start shock and improve the acceleration responsiveness.

While the preferred embodiment of this invention has been described in detail by reference to the drawings, it is to be understood that the invention may be otherwise embodied.

For example, in the above-described embodiment, one of the PUSH starting type and the TDC starting type is selected as the engine starting type in accordance with the method shown in FIG. 3. However, the selection of the engine starting type may be also made otherwise. The selection of the engine starting type may be also made, for example, by comparing the estimated MG rotational speed Nme and a determination speed value that corresponds to the MG rotational speed Nm. Further, the estimated MG rotational speed Nme may be also calculated based on the current value of the MG rotational speed Nm and the current value of the system shaft torque Tsys.

Further, the control routine shown in the flow chart of FIG. 5 may be modified as needed. For example, when the affirmative determination is made at step S10, step S30 may be also implemented before implementation of step S20.

Further, in the above-described embodiment, the automatic transmission 24 is constituted by an automatic transmission of planetary gear type. However, this arrangement is not essential. For example, the automatic transmission 24 may be any one of other type transmissions such as a synchronous mesh twin shaft parallel axis-type automatic transmission including a known DCT (Dual Clutch Transmission). It is noted that the automatic transmission 24 does not necessarily have to be provided in the vehicle to which is the present invention is applied.

Further, in the above-described embodiment, the fluid transmission device in the form of the torque converter 22 is provided in the power transmission device 16. However, the provision of the torque converter 22 is not essential. For example, the fluid transmission device may be constituted by, in place of the torque converter 22, by another fluid transmission device such as a fluid coupling device without a function of torque boost effect. Moreover, the fluid transmission device does not necessarily have to be provided but may be replaced by a starting clutch, for example. That is, the present invention is applicable to any vehicle that includes (i) an engine, (ii) drive wheels, (iii) an electric motor connected to a power transmission path between the engine and the drive wheels in a power transmittable manner and (iv) a clutch provided between the engine and the electric motor in the power transmission path.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine
14: drive wheels
20: K0 clutch (clutch)
36: electric-motor connection shaft (transmission shaft)
90: electronic control apparatus (control apparatus)
98: engine-start control portion
MG: electric motor

What is claimed is:

1. A control apparatus for a vehicle that includes (i) an engine, (ii) drive wheels, (iii) an electric motor connected to a power transmission path between the engine and the drive wheels in a power transmittable manner and (iv) a clutch provided between the engine and the electric motor in the power transmission path, the control apparatus comprising:
an engine-start control portion is configured, when the engine is to be started, to control the clutch such that a cranking torque required by cranking for increasing a rotational speed of the engine is transmitted through the clutch and such that a synchronization between input and output rotational speeds of the clutch is completed,
wherein the engine-start control portion is configured, in conjunction with the cranking, to control the electric motor such that the cranking torque is outputted by the electric motor, and to control the engine such that operation of the engine is initiated,
wherein the engine-start control portion is configured to start the engine in an engine starting manner that is a selected one of first and second starting manners, such that the rotational speed of the engine is increased by the cranking torque and then the engine is exploded after completion of the synchronization in the first starting manner, and such that the engine is exploded in process to the completion of the synchronization and then the rotational speed of the engine is increased by at least a torque of the engine after explosion of the engine in the second starting manner,
wherein the engine-start control portion is configured to execute an engine-start delay control for delaying start of the engine, in a case in which, when the start of the engine is requested, a requested drive amount requested to the vehicle is realized by only a torque of the electric motor and the first starting manner is being selected as the engine starting manner for starting the engine,
wherein, in a case in which a predetermined time elapses from initiation of the engine-start delay control, the engine-start control portion is configured to terminate the engine-start delay control and to start the engine in the first starting manner, and
wherein, in a case in which the engine starting manner is switched from the first starting manner to the second starting manner before the predetermined time elapses from the initiation of the engine-start delay control, the engine-start control portion is configured to terminate the engine-start delay control and to start the engine in the second starting manner.

2. The control apparatus according to claim 1,
wherein the engine-start control portion is configured to select the first starting manner in a case in which a rotational speed of the electric motor is lower than a lower-limit speed value that is minimally required to determine that a start shock caused upon the start of the engine in the second starting manner is tolerable, and
wherein the engine-start control portion is configured to select the second starting manner in a case in which the rotational speed of the electric motor is not lower than the lower-limit speed value.

3. The control apparatus according to claim 1,
wherein the engine-start control portion is configured to allow execution of the engine-start delay control, when determining that the start of the engine in the second starting manner is ready to be executed.

4. The control apparatus according to claim 1,
wherein, in a case in which, when the start of the engine is requested, the requested drive amount requested to the vehicle is not realized by only the torque of the electric motor, the engine-start control portion is configured to not execute the engine-start delay control or terminate the engine-start delay control, and to select one of the first and second starting manners as the engine starting manner, so as to start the engine in the selected one of the first and second starting manners.

5. The control apparatus according to claim 1,
wherein the engine-start control portion is configured to select one of the first and second starting manners as the engine starting manner, depending on a rotational speed of the electric motor and a transmission shaft torque applied to a transmission shaft to which the electric motor is connected in a power transmittable manner in the power transmission path and to which the engine is connected through the clutch in a power transmittable manner in the power transmission path.

6. The control apparatus according to claim 1, further comprising a power-source control portion and a clutch control portion, wherein the engine-start control portion is configured, when the engine is to be started, to output, to the clutch control portion, a command requesting the cranking torque to be transmitted through the clutch and requesting the synchronization between the input and output rotational speeds of the clutch to be completed, and wherein the engine-start control portion is configured, when the engine is to be started, to output, to the power-source control portion, a command requesting the cranking torque to be outputted by the electric motor in conjunction with the cranking, and a command requesting the operation of the engine to be initiated in conjunction with the cranking.

* * * * *